US010811998B2

United States Patent
Kajino

(10) Patent No.: US 10,811,998 B2
(45) Date of Patent: Oct. 20, 2020

(54) DRIVING DEVICE, PIEZOELECTRIC MOTOR, ROBOT, ELECTRONIC-COMPONENT CONVEYING DEVICE, AND PRINTER

(71) Applicant: Seiko Epson Corporation, Tokyo (JP)

(72) Inventor: Kiichi Kajino, Matsumoto (JP)

(73) Assignee: Seiko Epson Corporation (JP)

( * ) Notice: Subject to any disclaimer, the term of this patent is extended or adjusted under 35 U.S.C. 154(b) by 484 days.

(21) Appl. No.: 15/782,226

(22) Filed: Oct. 12, 2017

(65) Prior Publication Data
US 2018/0123483 A1 May 3, 2018

(30) Foreign Application Priority Data

Oct. 27, 2016 (JP) .................. 2016-211052

(51) Int. Cl.
H02N 2/00 (2006.01)
H02N 2/10 (2006.01)
H02N 2/02 (2006.01)
H02N 2/14 (2006.01)

(52) U.S. Cl.
CPC ........... H02N 2/001 (2013.01); H02N 2/0025 (2013.01); H02N 2/026 (2013.01); H02N 2/101 (2013.01); H02N 2/103 (2013.01); H02N 2/14 (2013.01); H02N 2/142 (2013.01)

(58) Field of Classification Search
CPC ............ H02N 2/00; H02N 2/001; H02N 2/10; H02N 2/101; H02N 2/14
See application file for complete search history.

(56) References Cited

U.S. PATENT DOCUMENTS

| 8,693,116 | B2 | 4/2014 | Kuwano et al. | |
|---|---|---|---|---|
| 9,348,150 | B2* | 5/2016 | Shihoh | G02B 27/64 |
| 9,871,468 | B2* | 1/2018 | Kojima | H02N 2/004 |
| 10,404,918 | B2* | 9/2019 | Oda | H04N 5/23287 |
| 2011/0317292 | A1* | 12/2011 | Kuwano | G02B 7/08 359/824 |
| 2012/0081803 | A1* | 4/2012 | Kuwano | G02B 7/08 359/824 |
| 2013/0140953 | A1* | 6/2013 | Miyazawa | H01L 41/0906 310/330 |

(Continued)

FOREIGN PATENT DOCUMENTS

| JP | 2014-075955 A | 4/2014 |
|---|---|---|
| JP | 2015-008631 A | 1/2015 |

Primary Examiner — J. San Martin
(74) Attorney, Agent, or Firm — Harness, Dickey & Pierce, P.L.C.

(57) ABSTRACT

A driving device includes a plurality of vibrating bodies including transmitting sections configured to transmit vibration to a driven section and a control section configured to change vibration tracks of the transmitting sections of at least a pair of the vibrating bodies independently from one another. When a direction in which the driven section and the vibrating bodies are arranged is represented as a first direction and a direction orthogonal to the first direction is represented as a second direction, at least the two vibrating bodies have a plurality of vibration modes in which amplitudes in at least one of the first direction and the second direction of the transmitting sections are different, and the control section drives the at least two vibrating bodies in any one vibration mode among the plurality of vibration modes.

12 Claims, 16 Drawing Sheets

(56) References Cited

U.S. PATENT DOCUMENTS

| | | | |
|---|---|---|---|
| 2013/0140954 A1* | 6/2013 | Kamijo | H01L 41/053 310/330 |
| 2015/0130956 A1* | 5/2015 | Ohashi | G02B 27/64 348/208.11 |
| 2015/0158184 A1* | 6/2015 | Kamijo | H02N 2/103 74/490.05 |
| 2015/0349665 A1* | 12/2015 | Kamijo | H02N 2/103 310/323.16 |
| 2015/0362695 A1* | 12/2015 | Shihoh | G03B 5/00 250/208.1 |

* cited by examiner

|  |  | VIBRATING BODY 2 | VIBRATING BODY 2 | VIBRATING BODY 2 | VIBRATING BODY 2 |
|---|---|---|---|---|---|
| ROTATING SPEED | LOW SPEED | FIRST VIBRATION MODE | SECOND VIBRATION MODE | SECOND VIBRATION MODE | SECOND VIBRATION MODE |
|  | INTERMEDIATE SPEED | FIRST VIBRATION MODE | FIRST VIBRATION MODE | SECOND VIBRATION MODE | SECOND VIBRATION MODE |
|  | HIGH SPEED | FIRST VIBRATION MODE | FIRST VIBRATION MODE | FIRST VIBRATION MODE | SECOND VIBRATION MODE |
|  | ULTRAHIGH SPEED | FIRST VIBRATION MODE | FIRST VIBRATION MODE | FIRST VIBRATION MODE | FIRST VIBRATION MODE |

FIG. 9

|  |  | VIBRATING BODY 2 | VIBRATING BODY 2 | VIBRATING BODY 2 | VIBRATING BODY 2 |
|---|---|---|---|---|---|
| ROTATING SPEED | LOW SPEED | FIRST VIBRATION MODE | THIRD VIBRATION MODE | THIRD VIBRATION MODE | THIRD VIBRATION MODE |
|  | INTERMEDIATE SPEED | FIRST VIBRATION MODE | FIRST VIBRATION MODE | THIRD VIBRATION MODE | THIRD VIBRATION MODE |
|  | HIGH SPEED | FIRST VIBRATION MODE | FIRST VIBRATION MODE | FIRST VIBRATION MODE | THIRD VIBRATION MODE |
|  | ULTRAHIGH SPEED | FIRST VIBRATION MODE | FIRST VIBRATION MODE | FIRST VIBRATION MODE | FIRST VIBRATION MODE |

FIG.11

| ROTATING SPEED | | VIBRATING BODY 2 | VIBRATING BODY 2 | VIBRATING BODY 2 | VIBRATING BODY 2 | VIBRATING BODY 2 |
|---|---|---|---|---|---|---|
| LOW SPEED | LOW SPEED 1 | FIRST VIBRATION MODE | THIRD VIBRATION MODE | THIRD VIBRATION MODE | THIRD VIBRATION MODE | THIRD VIBRATION MODE |
| | LOW SPEED 2 | FIRST VIBRATION MODE | SECOND VIBRATION MODE | THIRD VIBRATION MODE | THIRD VIBRATION MODE | THIRD VIBRATION MODE |
| | LOW SPEED 3 | FIRST VIBRATION MODE | SECOND VIBRATION MODE | SECOND VIBRATION MODE | THIRD VIBRATION MODE | THIRD VIBRATION MODE |
| | LOW SPEED 4 | FIRST VIBRATION MODE | SECOND VIBRATION MODE | SECOND VIBRATION MODE | SECOND VIBRATION MODE | SECOND VIBRATION MODE |
| INTERMEDIATE SPEED | INTERMEDIATE SPEED 1 | FIRST VIBRATION MODE | FIRST VIBRATION MODE | THIRD VIBRATION MODE | THIRD VIBRATION MODE | THIRD VIBRATION MODE |
| | INTERMEDIATE SPEED 2 | FIRST VIBRATION MODE | FIRST VIBRATION MODE | SECOND VIBRATION MODE | SECOND VIBRATION MODE | THIRD VIBRATION MODE |
| | INTERMEDIATE SPEED 3 | FIRST VIBRATION MODE | FIRST VIBRATION MODE | SECOND VIBRATION MODE | SECOND VIBRATION MODE | SECOND VIBRATION MODE |
| HIGH SPEED | HIGH SPEED 1 | FIRST VIBRATION MODE | FIRST VIBRATION MODE | FIRST VIBRATION MODE | FIRST VIBRATION MODE | THIRD VIBRATION MODE |
| | HIGH SPEED 2 | FIRST VIBRATION MODE | FIRST VIBRATION MODE | FIRST VIBRATION MODE | FIRST VIBRATION MODE | SECOND VIBRATION MODE |
| ULTRAHIGH SPEED | — | FIRST VIBRATION MODE | FIRST VIBRATION MODE | FIRST VIBRATION MODE | FIRST VIBRATION MODE | FIRST VIBRATION MODE |

FIG. 12

DRIVING DEVICE, PIEZOELECTRIC MOTOR, ROBOT, ELECTRONIC-COMPONENT CONVEYING DEVICE, AND PRINTER

BACKGROUND

1. Technical Field

The present invention relates to a driving device, a piezoelectric motor, a robot, an electronic-component conveying device, and a printer.

2. Related Art

As a driving device that drives to displace a driven body, there has been known a driving device including a plurality of driving elements that are disposed side by side in a direction in which the driven body is displaced and vibrate in a direction parallel to the direction in which the driven body is displaced and a contactor that transmits the vibration of the driving elements to the driven body, the driving device transmitting the vibration of the driving elements to the driven body with the contactor to displace the driven body (e.g., JP-A-2014-75955 (Patent Literature 1)).

However, the driving device disclosed in Patent Literature 1 cannot change a vibration track of the contactor. Therefore, for example, the rotating speed of the driven body cannot be highly accurately controlled. It is difficult to exhibit an excellent driving characteristic.

SUMMARY

An advantage of some aspects of the invention is to provide a driving device, a piezoelectric motor, a robot, an electronic-component conveying device, and a printer having an excellent driving characteristic.

The advantage can be achieved by the following configurations.

A driving device according to an aspect of the invention includes: a plurality of vibrating bodies including transmitting sections configured to transmit vibration to a driven section; and a control section configured to change vibration tracks of the transmitting sections of the plurality of vibrating bodies independently from one another.

With the driving device having such a configuration, by controlling the vibration tracks of the transmitting sections of the plurality of vibrating bodies independently from one another (e.g., controlling the vibration tracks of the transmitting sections of all the vibrating bodies to be the same or controlling the vibration track of the transmitting section of a certain vibrating body to be different from the vibration tracks of the transmitting sections of the other vibrating bodies), it is possible to highly accurately control the driving of the driven section and stably drive the driven section under desired conditions. Therefore, the driving device has an excellent driving characteristic.

In the driving device according to the aspect of the invention, it is preferable that the vibration tracks of the transmitting sections of the plurality of vibrating bodies are different from one another.

With this configuration, it is possible to more highly accurately control the driving of the driven section.

In the driving device according to the aspect of the invention, it is preferable that, when a direction in which the driven section and the vibrating bodies are arranged is represented as a first direction and a direction orthogonal to the first direction is represented as a second direction, the plurality of vibrating bodies have a plurality of vibration modes in which amplitudes in at least one of the first direction and the second direction are different, and the control section drives the plurality of vibrating bodies in any one vibration mode among the plurality of vibration modes.

If the vibrating bodies have the plurality of vibration modes in this way, by selecting one vibration mode out of the plurality of vibration modes, it is possible to easily change the vibration tracks of the transmitting sections. Therefore, the control in the control section is simplified.

In the driving device according to the aspect of the invention, it is preferable that the plurality of vibration modes include a first vibration mode in which the transmitting sections have amplitudes in the first direction and the second direction and a second vibration mode in which the amplitude in the second direction is smaller than the amplitude in the first vibration mode in the transmitting sections.

With this configuration, it is possible to more surely and smoothly rotate the driven section. Further, the configuration of the vibrating bodies is simplified.

In the driving device according to the aspect of the invention, it is preferable that the plurality of vibration modes include a first vibration mode in which the transmitting sections have amplitudes in the first direction and the second direction and a third vibration mode in which the amplitude in the first direction is smaller than the amplitude in the first vibration mode in the transmitting sections.

With this configuration, it is possible to more surely and smoothly rotate the driven section. Further, the configuration of the vibrating bodies is simplified.

In the driving device according to the aspect of the invention, it is preferable that the control section changes, according to driving speed of the driven section, a number of the vibrating bodies in which the transmitting sections vibrate in the first vibration mode.

With this configuration, it is possible to more highly accurately control the driving of the driven section and exhibit a more excellent driving characteristic.

In the driving device according to the aspect of the invention, it is preferable that, when the driving speed of the driven section increases, the control section increases the number of vibrating bodies in which the transmitting sections vibrate in the first vibration mode.

With this configuration, it is possible to more highly accurately control the driving of the driven section and exhibit a more excellent driving characteristic.

In the driving device according to the aspect of the invention, it is preferable that the vibrating body includes a piezoelectric body.

With this configuration, it is possible to vibrate the vibrating body with a simple configuration. It is also possible to achieve a reduction in the size of the vibrating body.

In the driving device according to the aspect of the invention, it is preferable that the vibrating body includes a stacked plurality of the piezoelectric bodies.

With this configuration, a driving force of the vibrating body further increases.

A piezoelectric motor according to an aspect of the invention includes the driving device according to the aspect of the invention.

With this configuration, it is possible to obtain the piezoelectric motor that can enjoy the effects of the driving device and has an excellent driving characteristic.

A robot according to an aspect of the invention includes the driving device according to the aspect of the invention.

With this configuration, it is possible to obtain the robot that can enjoy the effects of the driving device and has high reliability.

An electronic-component conveying device according to an aspect of the invention includes the driving device according to the aspect of the invention.

With this configuration, it is possible to obtain the electronic-component conveying device that can enjoy the effects of the driving device and has high reliability.

A printer according to an aspect of the invention includes the driving device according to the aspect of the invention.

With this configuration, it is possible to obtain the printer that can enjoy the effects of the driving device and has high reliability.

BRIEF DESCRIPTION OF THE DRAWINGS

The invention will be described with reference to the accompanying drawings, wherein like numbers reference like elements.

FIG. 9 is a table showing a control method (a driving method) for the piezoelectric motor.

FIG. 11 is a table showing a control method (a driving method) for the piezoelectric motor.

FIG. 12 is a table showing a control method (a driving method) for a piezoelectric motor according to a third embodiment of the invention.

DESCRIPTION OF EXEMPLARY EMBODIMENTS

Preferred embodiments of the invention are explained in detail below with reference to the accompanying drawings.

First Embodiment

First, a piezoelectric motor according to a first embodiment of the invention is explained.

Figure 1:
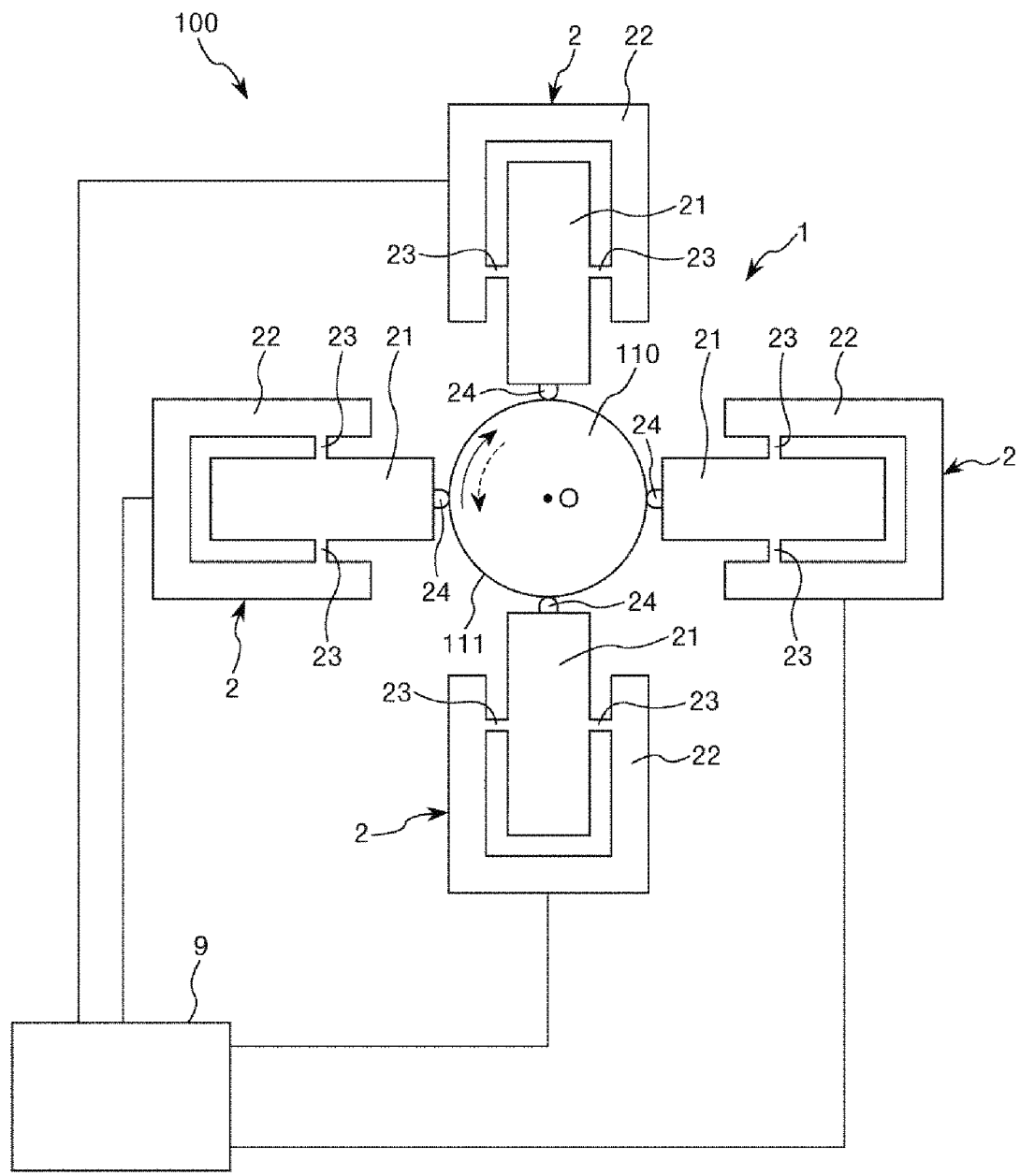
FIG. 1 is a plan view showing an overall configuration of a piezoelectric motor according to a first embodiment of the invention.
Figure 2:
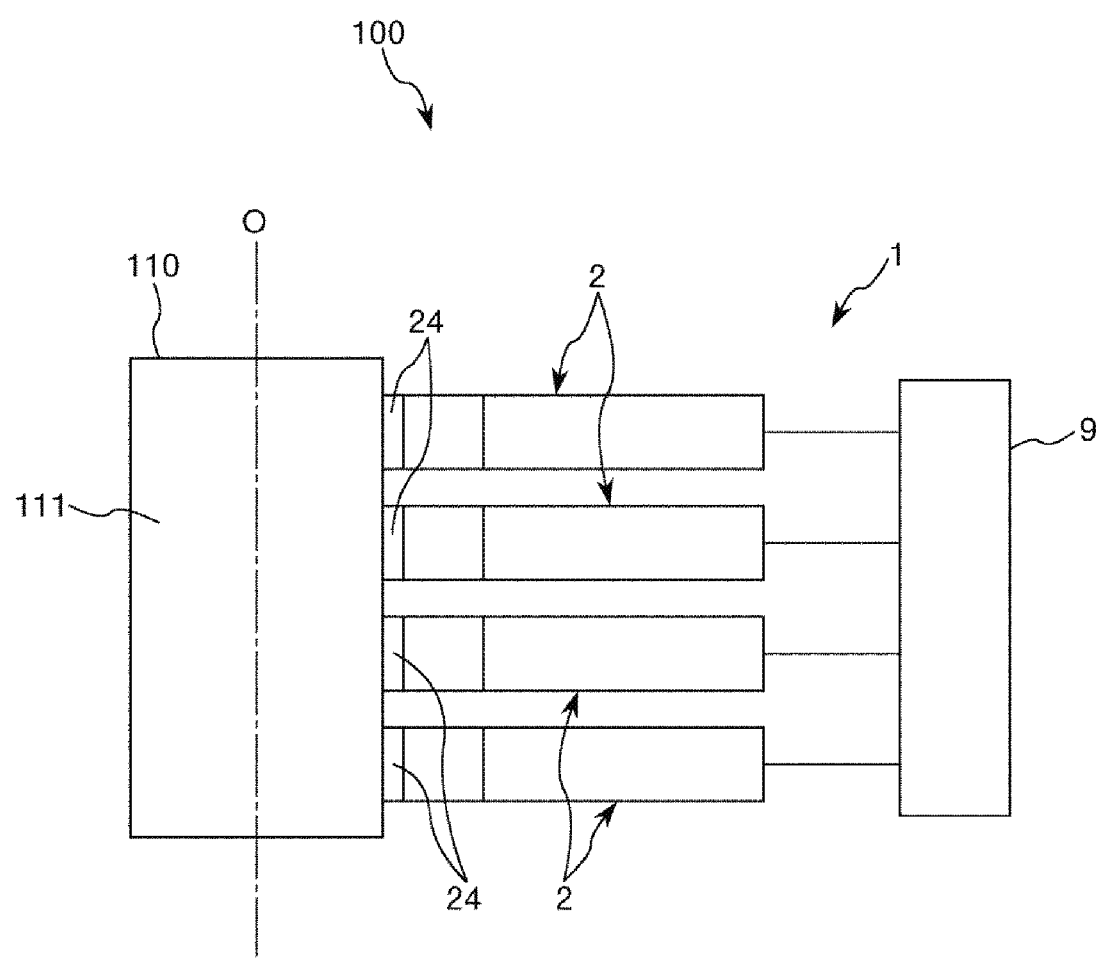
FIG. 2 is a side view showing a modification of the piezoelectric motor shown in FIG. 1.
Figure 3:
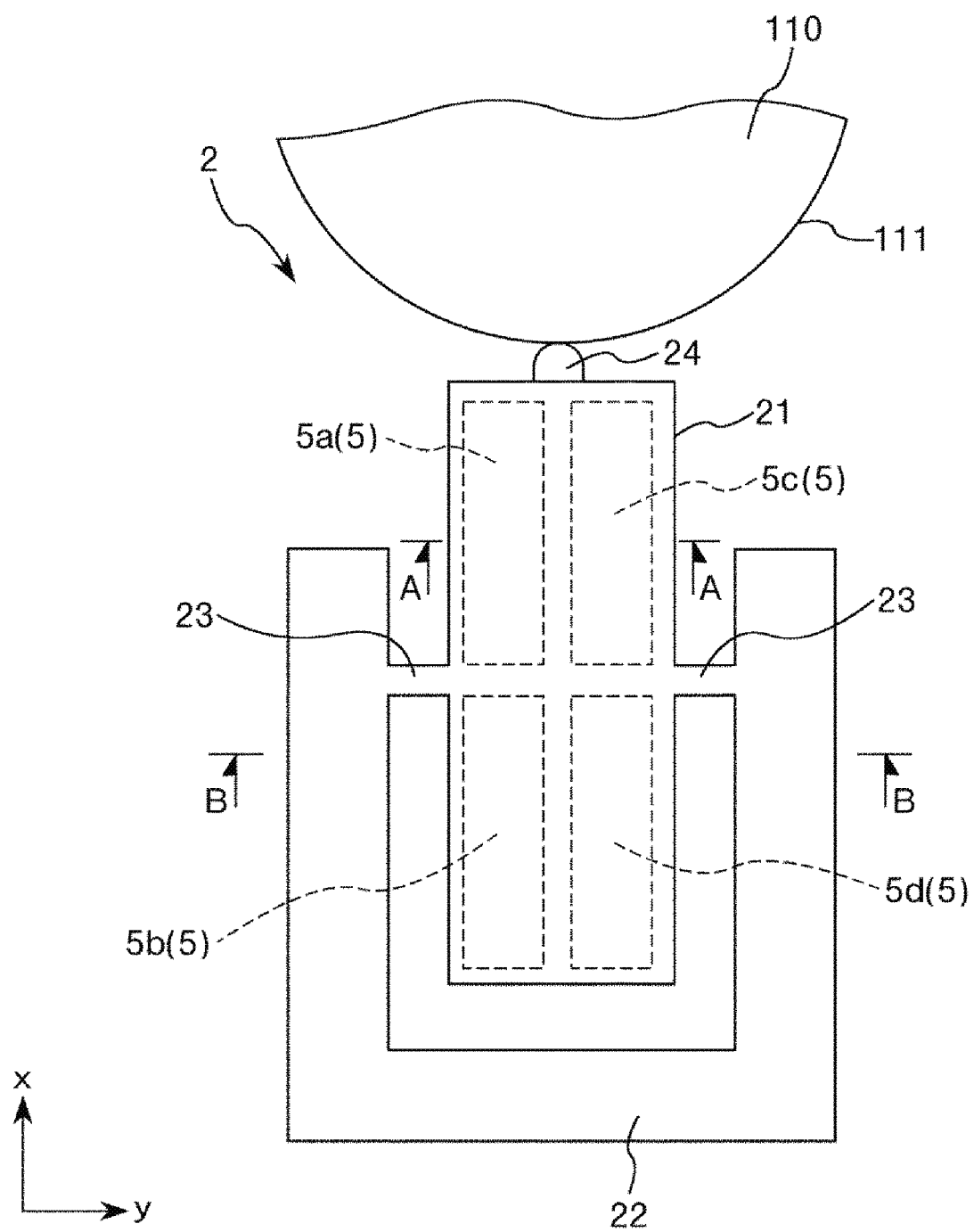
FIG. 3 is a plan view showing a vibrating body included in the piezoelectric motor shown in FIG. 1.
Figure 4:
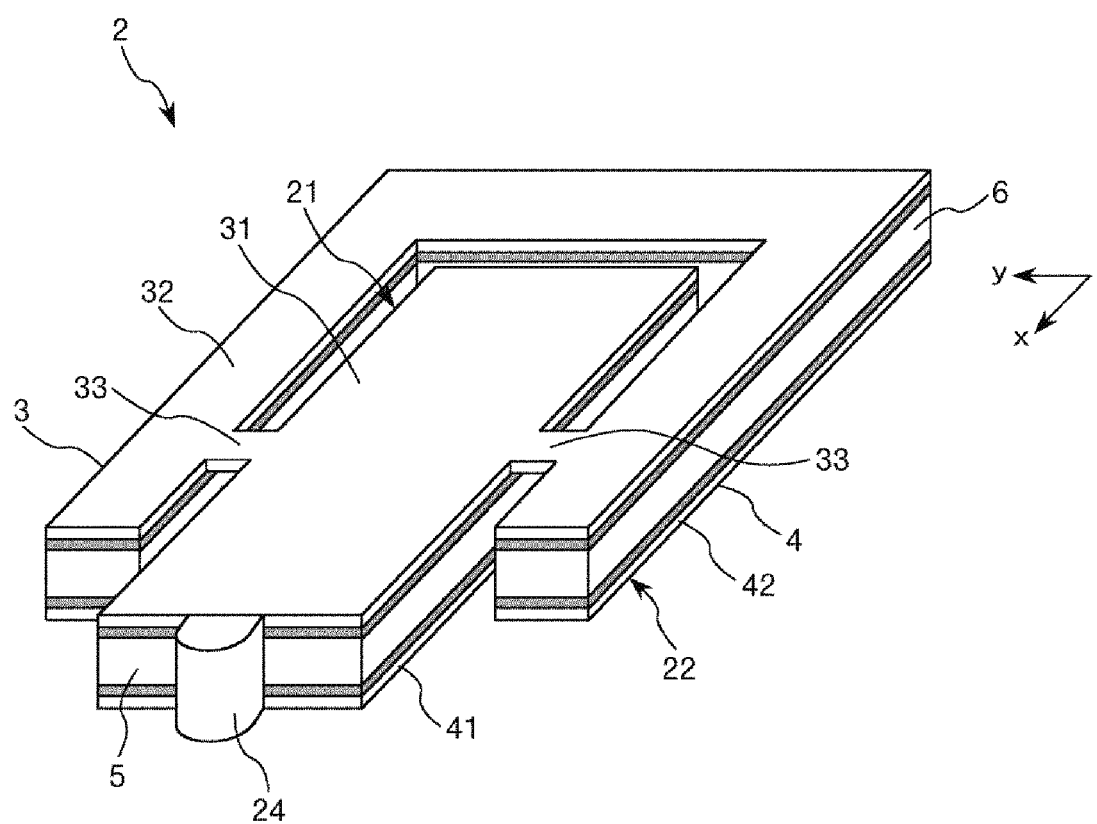
FIG. 4 is a perspective view of the vibrating body shown in FIG. 3.
Figure 5:
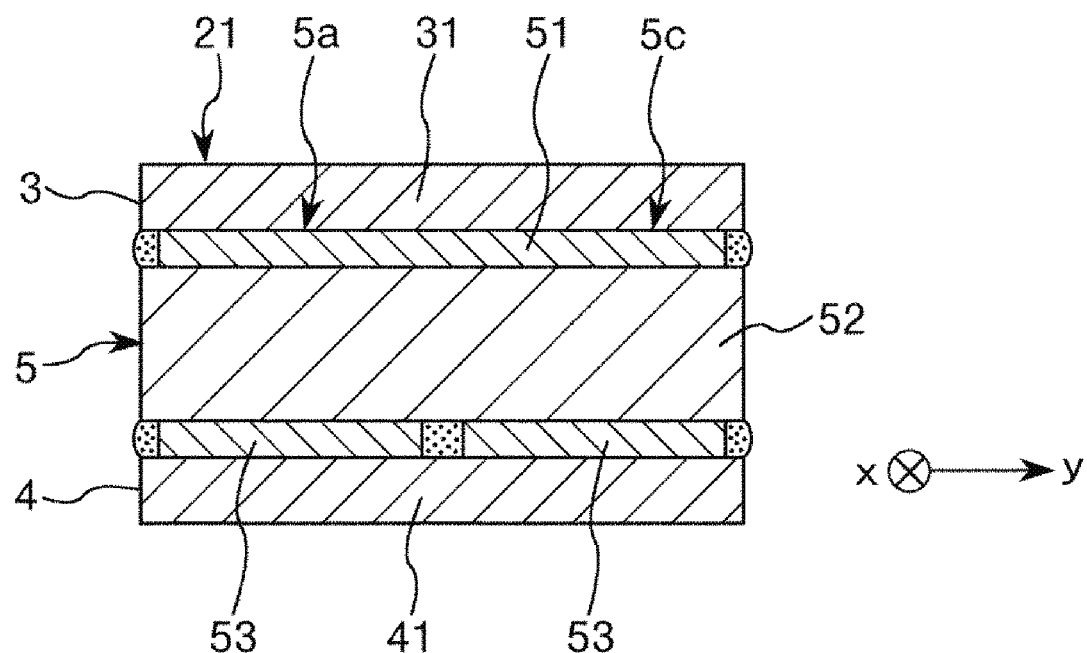
FIG. 5 is an A-A line sectional view in FIG. 3.
Figure 6:
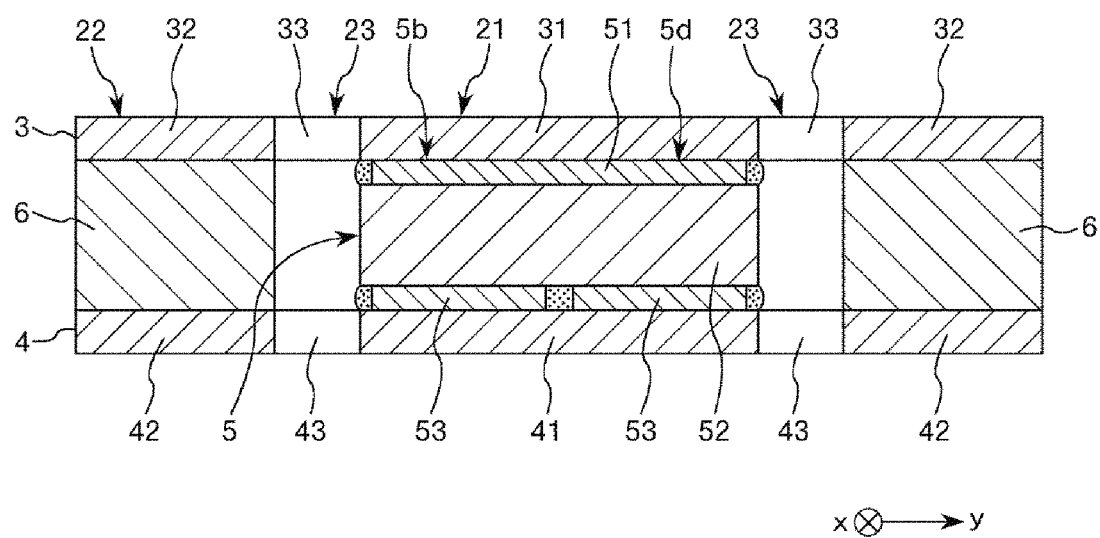
FIG. 6 is a B-B line sectional view in FIG. 3.
Figure 7:
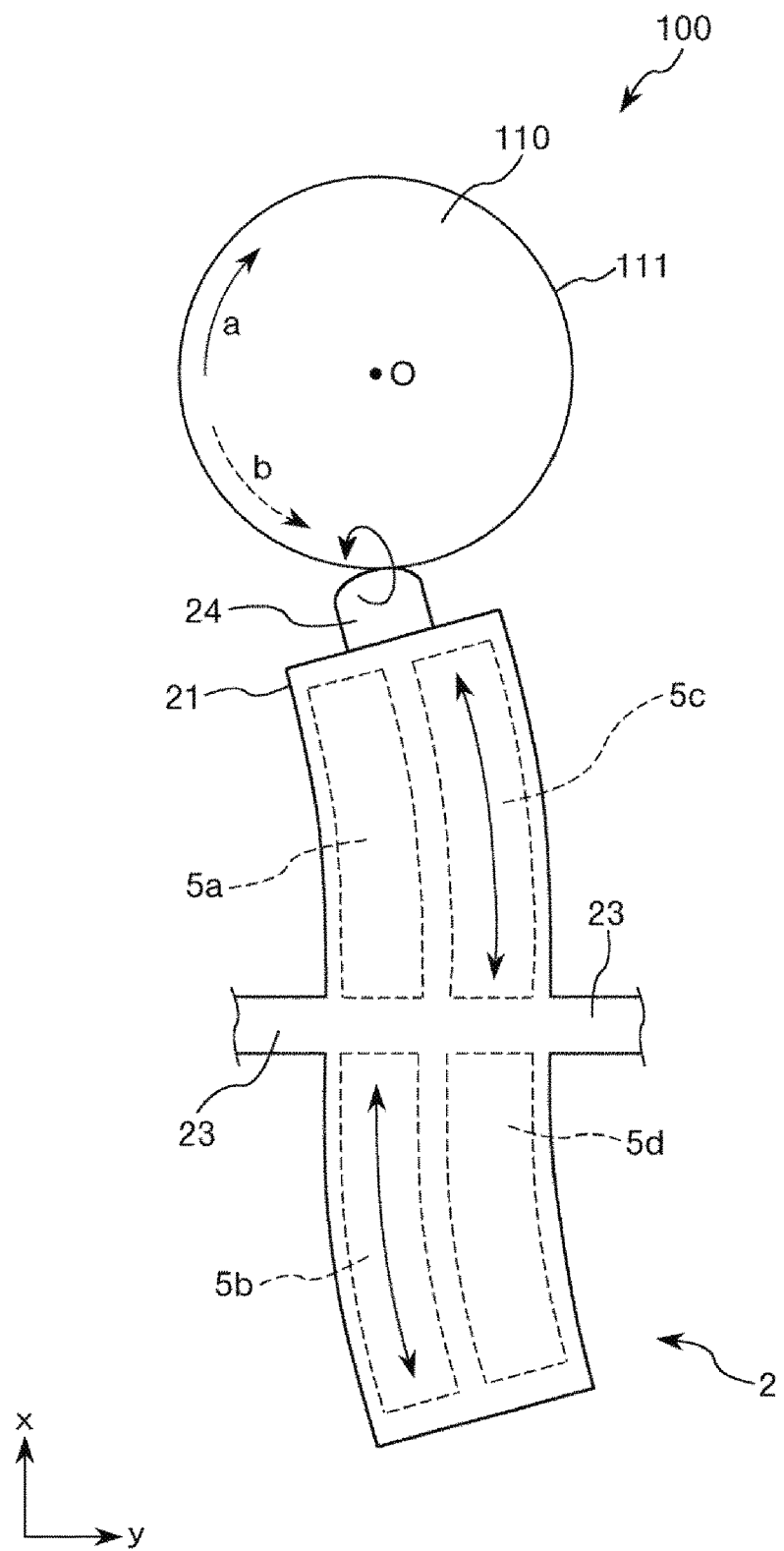
FIG. 7 is a plan view showing a first vibration mode.
Figure 8:
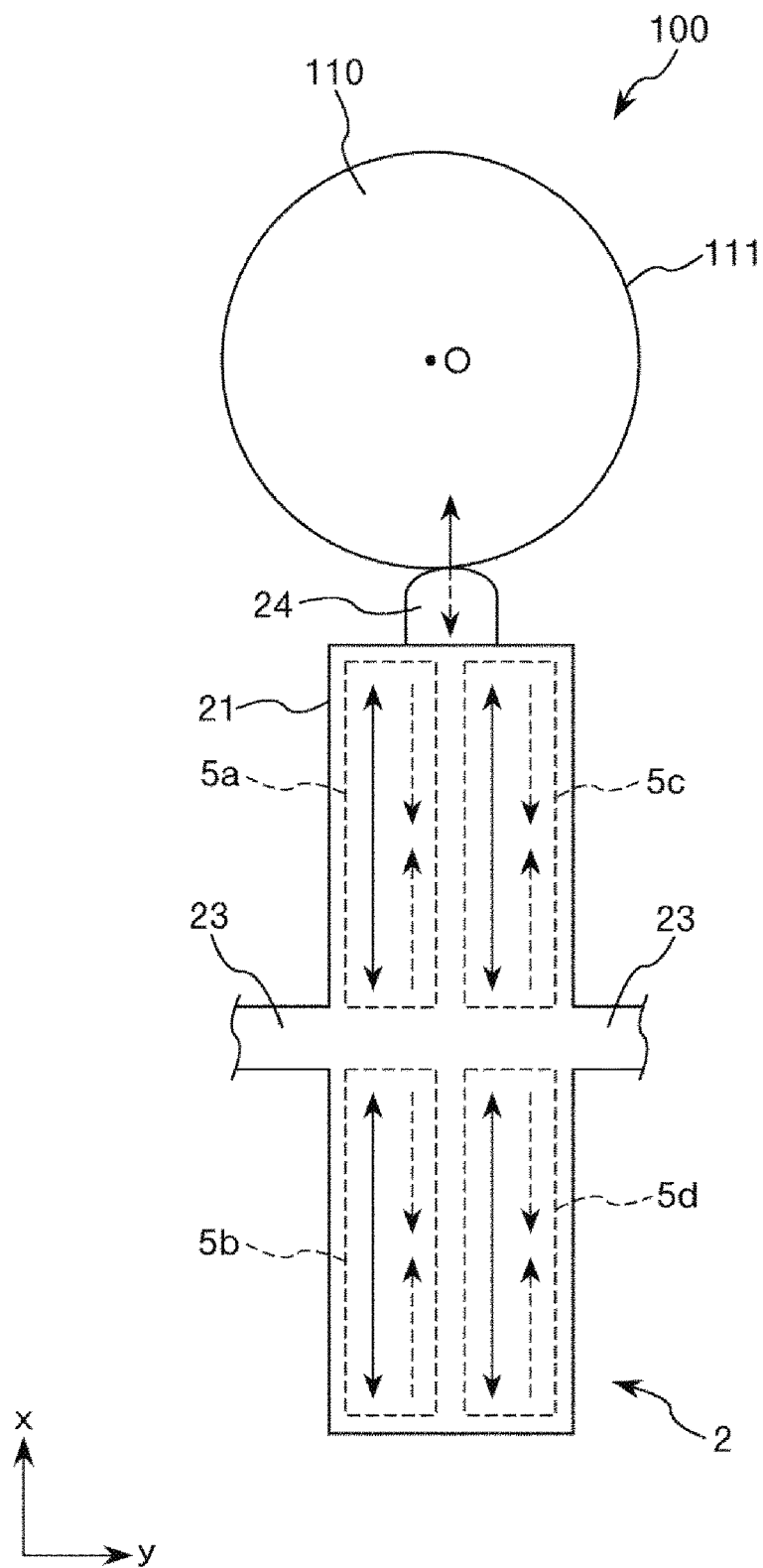
FIG. 8 is a plan view showing a second vibration mode.

FIG. 1 is a plan view showing an overall configuration of a piezoelectric motor according to a first embodiment of the invention. FIG. 2 is a side view showing a modification of the piezoelectric motor shown in FIG. 1. FIG. 3 is a plan view showing a vibrating body included in the piezoelectric motor shown in FIG. 1. FIG. 4 is a perspective view of the vibrating body shown in FIG. 3. FIG. 5 is an A-A line sectional view in FIG. 3. FIG. 6 is a B-B line sectional view in FIG. 3. FIG. 7 is a plan view showing a first vibration mode. FIG. 8 is a plan view showing a second vibration mode. FIG. 9 is a table showing a control method (a driving method) for the piezoelectric motor. Note that, in the following explanation, for convenience of explanation, the near side on the paper surface in FIG. 1 is also referred to as "upper" and the depth side on the paper surface in FIG. 1 is also referred to as "lower". A rotor side of a driving device is also referred to as "distal end side" and the opposite side of the rotor is also referred to as "proximal end side".

A piezoelectric motor 100 (an ultrasonic motor) shown in FIG. 1 includes a rotor 110 functioning as a driven section rotatable around a turning axis O and a driving device 1 that rotates the rotor 110. The piezoelectric motor 100 can rotate the rotor 110 around the turning axis O by driving (vibrating) the driving device 1. Note that the configuration of the piezoelectric motor 100 is not limited to the configuration shown in FIG. 1. For example, in this embodiment, the rotor 110 that rotates and moves is used as the driven section. However, the driven section is not limited to the rotor 110. For example, a linearly moving section may be used as the driven section.

The driving device 1 is explained in detail below. As shown in FIG. 1, the driving device 1 includes a plurality of vibrating bodies 2 including transmitting sections 24 that transmit vibration to the rotor 110 and a control section 9 that changes vibration tracks of the transmitting sections 24 of at least two vibrating bodies 2 independently from one another. By respectively driving (vibrating) the plurality of vibrating bodies 2, it is possible to rotate the rotor 110 around the turning axis O. With the driving device 1 having such a configuration, it is possible to control vibration tracks of the transmitting sections 24 of the plurality of vibrating bodies 2 independently from one another (e.g., control the vibration tracks of the transmitting sections 24 of all the vibrating bodies 2 to be the same or control the vibration track of the transmitting section 24 of a certain vibrating body 2 to be different from the vibration tracks of the transmitting sections 24 of the other vibrating bodies 2). Therefore, it is possible to highly accurately control rotation (speed, a braking force, torque, etc.) of the rotor 110. It is possible to more stably drive the rotor 110 under desired conditions (speed, etc.). Therefore, the driving device 1 has an excellent driving characteristic. The driving device 1 is explained in detail below.

As shown in FIG. 1, the driving device 1 includes the plurality of (four) vibrating bodies 2 and the control section 9 that controls driving of the vibrating bodies 2. The plurality of vibrating bodies 2 are each disposed in contact with an outer circumferential surface 111 of the rotor 110. The plurality of vibrating bodies 2 are disposed side by side spaced apart from one another in a rotating direction of the rotor 110 (a moving direction of the rotor 110: a circumferential direction of the rotor 110). Note that, in this embodiment, the plurality of vibrating bodies 2 are disposed at an equal angle interval around the rotor 110. However, the plurality of vibrating bodies 2 are not limited to such disposition.

Note that the driving device 1 in this embodiment includes the four vibrating bodies 2. However, the number of the vibrating bodies 2 is not particularly limited as long as the number is plural (two or more). The number may be two or three or may be five or more. However, the number of the vibrating bodies 2 is desirably five or more and two hundred or less. Consequently, the driving device 1 can exhibit a sufficient driving force while preventing an excessive increase in the size of the piezoelectric motor 100. In the driving device 1 in this embodiment, the plurality of vibrating bodies 2 are disposed side by side in the rotating direction of the rotor 110. However, for example, as shown in FIG. 2, the plurality of vibrating bodies 2 may be disposed side by side in a direction along the turning axis O of the rotor 110.

The configuration of the vibrating body 2 is explained. Note that the plurality of vibrating bodies 2 have the same configuration. As shown in FIG. 3, the vibrating body 2 includes a vibrating section 21, a supporting section 22 that supports the vibrating section 21, a pair of connecting sections 23 that connects the vibrating section 21 and the supporting section 22, and a transmitting section 24 provided in the vibrating section 21. The vibrating section 21 is formed in a substantially rectangular shape (longitudinal shape) in plan view viewed from the thickness direction of the vibrating body 2. The transmitting section 24 is provided at the distal end portion of the vibrating section 21. The supporting section 22 is formed in a U shape surrounding the proximal end side of the vibrating section 21.

The vibrating body 2 is fixed to a not-shown fixed member such as a stage in the supporting section 22. The transmitting section 24 vibrates when the vibrating section 21 vibrates. The vibration of the transmitting section 24 is transmitted to the rotor 110. Note that the vibrating body 2 is urged to be pressed against the rotor 110 by a not-shown urging member. The transmitting section 24 is in contact with the rotor 110 with a sufficient frictional force. Therefore, a slip is suppressed. It is possible to efficiently transmit the vibration of the transmitting section 24 to the rotor 110.

As shown in FIG. 4, the vibrating body 2 includes a first substrate 3, a second substrate 4, and a piezoelectric element 5 and an inter-substrate section 6 located between the first substrate 3 and the second substrate 4. As shown in FIGS. 5 and 6, the first substrate 3 includes a vibrating plate 31, a supporting plate 32 that supports the vibrating plate 31, and a pair of connecting sections 33 that connects the vibrating plate 31 and the supporting plate 32. Similarly, the second substrate 4 includes a vibrating plate 41, a supporting plate that supports the vibrating plate 41, and a pair of connecting sections 43 that connects the vibrating plate 41 and the supporting plate 42. The first substrate 3 and the second substrate 4 have substantially the same shape and the same size. The vibrating plates 31 and 41 are disposed across the piezoelectric element 5. The supporting plates 32 and 42 are disposed across the inter-substrate section 6. The vibrating section 21 is configured by a stacked body of the vibrating plate 31, the piezoelectric element 5, and the vibrating plate 41. The supporting section 22 is configured by a stacked body of the supporting plate 32, the inter-substrate section 6, and the supporting plate 42. The connecting sections 23 are configured by the connecting sections 33 and 43. The first substrate 3 and the second substrate 4 are not particularly limited. For example, a silicon substrate can be used.

As shown in FIG. 3, the piezoelectric element 5 includes four piezoelectric elements 5a, 5b, 5c, and 5d. The piezoelectric elements 5a and 5b are located on one side in the width direction of the vibrating section 21 and disposed along the longitudinal direction of the vibrating section 21. On the other hand, the piezoelectric elements 5c and 5d are located on the other side in the width direction of the vibrating section 21 and disposed along the longitudinal direction of the vibrating section 21.

As shown in FIGS. 5 and 6, the four piezoelectric elements 5a, 5b, 5c, and 5d each include a piezoelectric body 52, a first electrode 51 provided on the upper surface (a principal plane on the vibrating plate 31 side) of the piezoelectric body 52, and second electrodes 53 provided on the lower surface (a principal plane on the vibrating plate 41 side) of the piezoelectric body 52.

The first electrode 51 is a common electrode provided in common to the piezoelectric elements 5a, 5b, 5c, and 5d. On the other hand, the second electrode 53 is an individual electrode separately provided for each of the piezoelectric elements 5a, 5b, 5c, and 5d. The piezoelectric body 52 is integrally provided in common to the piezoelectric elements 5a, 5b, 5c, and 5d. Note that the piezoelectric body 52 may be individually provided for each of the piezoelectric elements 5a, 5b, 5c, and 5d.

The piezoelectric body 52 expands and contracts in a direction along the longitudinal direction of the vibrating section 21 when an electric field in a direction along the thickness direction of the vibrating section 21 is applied to the piezoelectric body 52. As a constituent material of the piezoelectric body 52, piezoelectric ceramics such as lead zirconate titanate (PZT), barium titanate, lead titanate, potassium niobate, lithium niobate, lithium tantalate, sodium tangustate, zinc oxide, barium strontium titanate (BST), strontium bismuth tantalate (SBT), lead metaniobate, and lead scandium niobate can be used. For example, the piezoelectric body 52 formed of the piezoelectric ceramics may be formed from a bulk material or may be formed using a sol-gel method or a sputtering method. Note that, as the constituent material of the piezoelectric body 52, besides the piezoelectric ceramics, polyvinylidene fluoride, quartz, and the like may be used.

A constituent material of the first electrode 51 and the second electrode 53 is not particularly limited as long as the constituent material has electric conductivity. Examples of the constituent material include metal materials such as aluminum (Al), nickel (Ni), gold (Au), platinum (Pt), iridium (Ir), copper (Cu), titanium (Ti), and tungsten (W), an alloy including at least one kinds of the metal materials (e.g., a titanium (Ti)/tungsten (W) alloy or a copper (Cu)/aluminum (Al) alloy), and an intermetallic component. One kind of the materials can be used or two or more kinds of the materials can be used in combination (e.g., as a stacked body of two or more layers). The first electrode 51 and the second electrode 53 can be each formed by evaporation, sputtering, or the like.

When a driving voltage supplied from a not-shown power supply section is applied between the first electrode 51 and the second electrode 53, the piezoelectric elements 5a, 5b, 5c, and 5d vibrate according to a pattern of the driving voltage. The entire vibrating section 21 vibrates.

As shown in FIGS. 4 and 6, the inter-substrate section 6 is located between the supporting plate 32 and the supporting plate 42. The inter-substrate section 6 has insulation. The thickness of the inter-substrate section 6 is substantially equal to the thickness of the piezoelectric element 5. The material of the inter-substrate section 6 is not particularly limited. Various ceramics such as zirconia, alumina, and titania, silicon, and various resin materials can be used.

The vibrating body 2 is explained above. As explained above, the vibrating body 2 includes the piezoelectric body 52 (the piezoelectric element 5) that vibrates with energization. Therefore, it is possible to vibrate the vibrating body 2 (the vibrating section 21) with a simple configuration. It is also possible to achieve a reduction in the size of the vibrating body 2.

Among the plurality of vibrating bodies 2, at least two vibrating bodies 2 each have a plurality of vibration modes in which vibration tracks of the transmitting sections 24 are different. Specifically, when a direction in which the rotor 110 and the vibrating bodies 2 are arranged is represented as a first direction x (the longitudinal direction of the vibrating sections 21: the vertical direction in FIG. 3) and a direction orthogonal to the first direction x is represented as a second direction y (the width direction of the vibrating sections 21: the horizontal direction in FIG. 3), the at least two vibrating bodies 2 have a plurality of vibration modes in which amplitudes in at least one of the first direction x and the second direction y are different. The control section 9 drives the at least two vibrating bodies 2 in any one vibration mode among the plurality of vibration modes. In this way, if the vibrating bodies 2 have the plurality of vibration modes in which the vibration tracks of the transmitting sections 24 are different, it is possible to change the vibration tracks of the transmitting sections 24 by selecting one vibration mode out of the plurality of vibration modes. Therefore, the control in the control section 9 is simplified.

Note that, as explained above, the at least two vibrating bodies 2 among the plurality of vibrating bodies 2 only have to have the plurality of vibration modes in which the vibration tracks of the transmitting sections 24 are different. In this embodiment, all the vibrating bodies 2 have the plurality of vibration modes in which the vibration tracks of the transmitting sections 24 are different. Consequently, it is possible to more highly accurately control the rotation (speed, a braking force, torque, etc.) of the rotor 110. The driving device 1 has a more excellent driving characteristic.

The plurality of vibration modes of the vibrating bodies 2 are explained. The plurality of vibration modes are not particularly limited as long as vibration tracks of the transmission sections 24 are different. In this embodiment, the plurality of vibration modes include a first vibration mode in which the transmitting sections 24 have amplitudes in the first direction x and the second direction y and a second vibration mode in which the amplitude in the second direction y is smaller than the amplitude in the first vibration mode in the transmitting sections 24.

For example, as shown in FIG. 7, the first vibration mode is a vibration mode in which the distal end of the transmitting section 24 performs an elliptical motion. To drive the vibrating body 2 in the first vibration mode, for example, an alternating voltage (a driving voltage) only has to be applied to the piezoelectric elements 5b and 5c to expand and contract the piezoelectric elements 5b and 5c at the same timing. Then, the vibrating section 21 is bent and deformed in an S shape in an in-plane direction of the vibrating section 21 (expanded or contracted and deformed in the first direction x and secondarily bent and deformed in the second direction y). The transmitting section 24 performs the elliptical motion. The first vibration mode is mainly a vibration mode for generating a driving force for rotating the rotor 110. That is, as shown in FIG. 7, when the vibrating body 2 is vibrated in the first vibration mode, the rotor 110 is pushed by the transmitting section 24. The roller 110 rotates in a direction of an arrow "a" around the turning axis O. Note that, if the alternating voltage (the driving voltage) is applied to the piezoelectric elements 5a and 5d to expand and contract the piezoelectric elements 5a and 5d, it is possible to vibrate the transmitting section 24 in an elliptical motion in a direction opposite to the direction of the elliptical motion shown in FIG. 7. It is possible to reversely rotate the rotor 110 (rotate the rotor 110 in a direction of an arrow "b" in FIG. 7).

On the other hand, the second vibration mode is, for example, as show in FIG. 8, a vibration mode in which the distal end of the transmitting section 24 performs a longitudinal motion (vibrates along the first direction x). To drive the vibrating body 2 in the second vibration mode, for example, an alternating voltage (a driving voltage) only has to be applied to the piezoelectric elements 5a, 5b, 5c, and 5d to expand and contract the piezoelectric elements 5a, 5b, 5c, and 5d at the same timing. The second vibration mode is a vibration mode for not substantially generating a driving force for rotating the rotor 110 and allowing rotation of the rotor 110 generated when the other vibrating bodies 2 vibrate in the first vibration mode.

More specifically, as explained above, the vibrating bodies 2 are urged toward the rotor 110. In a non-driven state, the transmitting sections 24 are in contact with an outer circumferential surface 111 of the rotor 110 with a sufficient frictional force. Therefore, when an un-driven vibrating body 2 is present, the vibrating body 2 acts as a resistance (a brake). Even if a part of the vibrating bodies 2 are vibrated in the first vibration mode to rotate the rotor 110, it is likely that the rotor 110 cannot be rotated or, even if the rotor 110 rotates, the rotor 110 does not reach desired rotating speed. Therefore, it is necessary to reduce a frictional force between the vibrating body 2 not driven in the first vibration mode and the rotor 110 and allow the rotation of the rotor 110. This is realized by the second vibration mode. Since the second vibration mode is longitudinal vibration (reciprocating vibration in directions approaching and separating from the rotor 110), the frictional force with the rotor 110 decreases when the vibrating body 2 vibrates in the direction separating from the rotor 110 (the frictional force is 0 if the transmitting section 24 separates from the rotor 110). Therefore, on average, compared with the non-driven state, it is possible to reduce the frictional force between the transmitting section 24 and the rotor 110. It is possible to allow the rotation of the rotor 110.

Since the plurality of vibration modes include the first vibration mode and the second vibration mode in this way, it is possible to more surely and smoothly rotate the rotor 110. Further, the configuration of the vibrating body 2 is simplified. This is more specifically explained. As explained above, the first vibration mode is the vibration mode for generating the driving force for rotating the rotor 110. Therefore, to rotate the rotor 110, the vibrating body 2 that can vibrate in the first vibration mode is necessary. A relatively simple configuration of the vibrating body 2 that can vibrate in the first vibration mode is the configuration including the four piezoelectric elements 5a, 5b, 5c, and 5d as in this embodiment. A vibration mode that can be realized by the vibrating body 2 having the configuration and can further reduce the frictional force with the rotor 110 than in the un-driven state is the second vibration mode. In this way, the second vibration mode is a vibration mode that can be easily generated by the vibrating body 2 that can vibrate in the first vibration mode. Therefore, the configuration of the vibrating body 2 is not complicated. As explained above, the configuration of the vibrating body 2 is simplified.

The control section 9 is explained. The control section 9 controls a pattern of a driving voltage supplied from the not-shown power supply section. The control section 9 can independently control driving of at least two vibrating bodies 2. Note that, in this embodiment, the control section 9 can independently control driving of all the vibrating bodies 2. That is, the control section 9 can select whether all the vibrating bodies 2 are driven in the first vibration mode or driven in the second vibration mode. Consequently, it is possible to more highly accurately control the rotation (speed, a braking force, torque, etc.) of the rotor 110. The driving device 1 has a more excellent driving characteristic.

The control section 9 changes, according to driving speed (rotating speed) of the rotor 110, the number of the vibrating bodies 2 in which the transmitting sections 24 vibrate in the first vibration mode. Consequently, it is possible to more highly accurately control the rotation (speed, a braking force, torque, etc.) of the rotor 110. The driving device 1 has a more excellent driving characteristic. Specifically, as the driving speed (the rotating speed) of the rotor 110 increases, the control section 9 increases the number of the vibrating bodies 2 in which the transmitting sections 24 vibrate in the first vibration mode. That is, the control section 9 generates a larger driving force as the driving speed (the rotating speed) of the rotor 110 increases. For example, as shown in FIG. 9, when the rotor 110 is driven at low speed, the control section 9 vibrates one vibrating body 2 in the first vibration mode and drives the other vibrating bodies 2 in the second vibration mode. When the rotor 110 is driven at intermediate speed (speed higher than the low speed), the control section 9 vibrates two vibrating bodies 2 in the first vibration mode and vibrates the other vibrating bodies 2 in the second vibration mode. When the rotor 110 is driven at high speed (speed higher than the intermediate speed), the control section 9 vibrates the three vibrating bodies 2 in the first vibration mode and vibrates the other vibrating bodies 2 in the second vibration mode. When the rotor 110 is driven at ultrahigh speed (speed higher than the high speed), the control section 9 vibrates all the vibrating bodies 2 in the first vibration mode. Note that, as the number of the vibrating bodies 2 vibrated in the first vibration mode increases, the torque also increases together with the driving speed. Consequently, it is possible to more highly accurately control the rotation (speed, a braking force, torque, etc.) of the rotor 110. The driving device 1 has a more excellent driving characteristic.

The piezoelectric motor 100 is explained above. The piezoelectric motor 100 includes the driving device 1. Therefore, since the piezoelectric motor 100 can enjoy the effects of the driving device 1 explained above, the piezoelectric motor 100 can exhibit an excellent driving characteristic.

Second Embodiment

A piezoelectric motor according to a second embodiment of the invention is explained.

Figure 10:
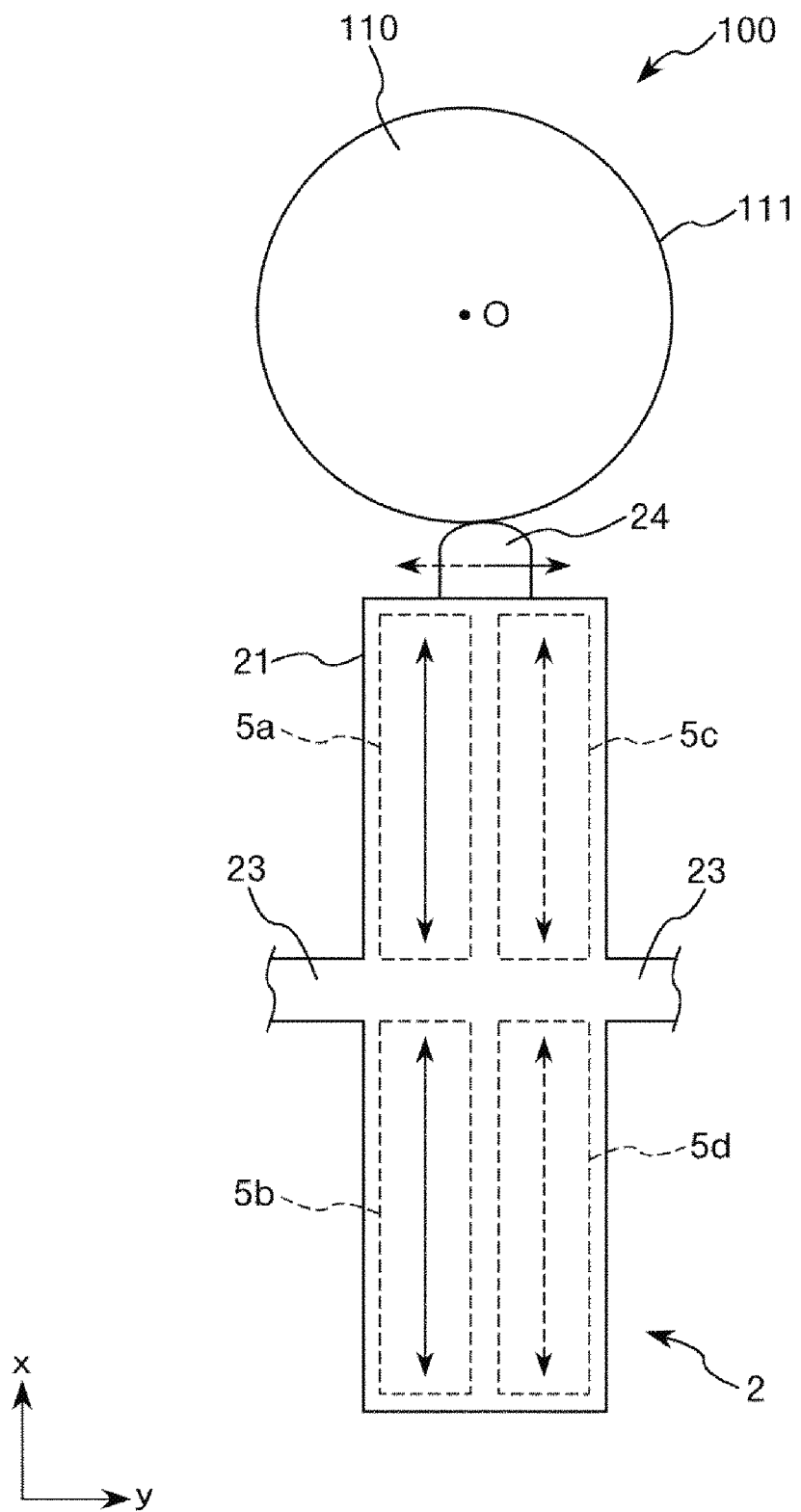
FIG. 10 is a plan view showing a third vibration mode of a vibrating body included in a piezoelectric motor according to a second embodiment of the invention.

FIG. 10 is a plan view showing a third vibration mode of a vibrating body included in the piezoelectric motor according to the second embodiment of the invention. FIG. 11 is a table showing a control method (a driving method) for the piezoelectric motor.

In the following explanation, concerning the piezoelectric motor according to the second embodiment, differences from the first embodiment are mainly explained. Explanation of similarities is omitted.

The piezoelectric motor according to the second embodiment is substantially the same as the piezoelectric motor according to the first embodiment except that vibration modes of the vibrating body are different. Note that the same components as the components in the first embodiment are denoted by the same reference numerals and signs.

In this embodiment, at least two vibrating bodies among the plurality of vibrating bodies 2 each have a plurality of vibration modes in which amplitude in at least one of the first direction x and the second direction y of the transmitting sections 24 is different. The control section 9 drives the at least two vibrating bodies 2 in any one vibration mode among the plurality of vibration modes. Note that, as explained above, the at least two vibrating bodies 2 among the plurality of vibrating bodies 2 only have to have the plurality of vibration modes in which vibration tracks of the transmitting sections 24 are different. In this embodiment, all the vibrating bodies 2 have the plurality of vibration modes in which the vibration tracks of the transmitting sections 24 are different. Consequently, it is possible to more highly accurately control the rotation (speed, a braking force, torque, etc.) of the rotor 110. The driving device 1 has a more excellent driving characteristic.

The plurality of vibration modes of the vibrating bodies 2 are explained. The plurality of vibration modes are not particularly limited as long as the vibration tracks of the transmitting sections 24 are different. In this embodiment, the plurality of vibration modes include a first vibration mode in which the transmission sections 24 have amplitudes in the first direction x and the second direction y and a third vibration mode in which amplitude in the first direction x is smaller than the amplitude in the first vibration mode in the transmitting sections 24.

Explanation of the first vibration mode is omitted because the first vibration mode is the same as the first vibration mode explained in the first embodiment. On the other hand, the third vibration mode is, for example, as shown in FIG. 10, a vibration mode in which the distal end of the transmitting section 24 performs a lateral motion (vibrates along the second direction y). To drive the vibrating body in the third vibration mode, for example, alternating voltages (driving voltages) phase-shifted by 180° only have to be applied to the piezoelectric elements 5a and 5b and the piezoelectric elements 5c and 5d to alternately expand and contract the piezoelectric elements 5a and 5b and the piezoelectric elements 5c and 5d. The third vibration mode is a vibration mode for not substantially generating a driving force for rotating the rotor 110 and allowing rotation of the rotor 110 generated when the other vibrating bodies 2 vibrate in the first vibration mode (e.g., a vibration mode having the same function as the function of the second vibration mode explained above).

More specifically, as explained in the first embodiment, when an un-driven vibrating body 2 is present, the vibrating body 2 acts as a resistance (a brake). Even if a part of the vibrating bodies 2 are vibrated in the first vibration mode to rotate the rotor 110, it is likely that the rotor 110 cannot be rotated or, even if the rotor 110 rotates, the rotor 110 does not reach desired rotating speed. Therefore, it is necessary to reduce a frictional force between the vibrating body 2 not driven in the first vibration mode and the rotor 110 and allow the rotation of the rotor 110. This is realized by the third vibration mode. Since the third vibration mode is lateral vibration and longitudinal vibration substantially does not occur, a frictional force between the transmitting section 24 and the rotor 110 is not as large as the frictional force in the first vibration mode. As a result, the transmitting section 24 vibrates to slide (slip) on the outer circumferential surface 111 of the rotor 110. Therefore, compared with the un-driven state, it is possible to reduce an average frictional force between the transmitting section 24 and the rotor 110. It is possible to allow the rotation of the rotor 110.

Since the plurality of vibration modes include the first vibration mode and the third vibration mode in this way, it is possible to more surely and smoothly rotate the rotor 110. Further, the configuration of the vibrating body 2 is simplified. That is, like the second vibration mode explained above, the third vibration mode is a vibration mode that can be easily generated by the vibrating body 2 that can vibrate in the first vibration mode. Therefore, the configuration of the vibrating body 2 is not complicated. As explained above, the configuration of the vibrating body 2 is simplified.

The control section 9 is explained. The control section 9 can independently control driving of at least two vibrating bodies 2. Note that, in this embodiment, the control section 9 can independently control driving of all the vibrating bodies 2. That is, the control section 9 can select whether all the vibrating bodies 2 are driven in the first vibration mode or driven in the third vibration mode. Consequently, it is possible to more highly accurately control the rotation (speed, a braking force, torque, etc.) of the rotor 110. The driving device 1 has a more excellent driving characteristic.

The control section 9 changes, according to driving speed (rotating speed) of the rotor 110, the number of the vibrating bodies 2 in which the transmitting sections 24 vibrate in the first vibration mode. Consequently, it is possible to more highly accurately control the rotation (speed, a braking force, torque, etc.) of the rotor 110. The driving device 1 has a more excellent driving characteristic. Specifically, as the driving speed (the rotating speed) of the rotor 110 increases, the control section 9 increases the number of the vibrating bodies 2 in which the transmitting sections 24 vibrate in the first vibration mode. That is, the control section 9 generates a larger driving force as the driving speed (the rotating speed) of the rotor 110 increases. For example, as shown in FIG. 11, when the rotor 110 is driven at low speed, the control section 9 vibrates one vibrating body 2 in the first vibration mode and vibrates the other vibrating bodies 2 in the third vibration mode. When the rotor 110 is driven at intermediate speed (speed higher than the low speed), the control section 9 vibrates two vibrating bodies 2 in the first vibration mode and vibrates the other vibrating bodies 2 in the third vibration mode. When the rotor 110 is driven at high speed (speed higher than the intermediate speed), the control section 9 vibrates the three vibrating bodies 2 in the first vibration mode and vibrates the other vibrating bodies 2 in the third vibration mode. When the rotor 110 is driven at ultrahigh speed (speed higher than the high speed), the control section 9 vibrates all the vibrating bodies 2 in the first vibration mode. Consequently, it is possible to more highly accurately control the rotation (speed, a braking force, torque, etc.) of the rotor 110. The driving device 1 has a more excellent driving characteristic.

According to the second embodiment explained above, it is possible to exhibit the same effects as the effects in the first embodiment.

Third Embodiment

A piezoelectric motor according to a third embodiment of the invention is explained.

FIG. 12 is a table showing a control method (a driving method) for the piezoelectric motor according to the third embodiment of the invention.

In the following explanation, concerning the piezoelectric motor according to the third embodiment, differences from the embodiments explained above are mainly explained. Explanation of similarities is omitted.

The piezoelectric motor according to the third embodiment is substantially the same as the piezoelectric motor according to the first embodiment except that vibration modes of the vibrating body are different. Note that the same components as the components in the embodiments explained above are denoted by the same reference numerals and signs.

In this embodiment, at least two vibrating bodies 2 among the plurality of vibrating bodies 2 have a plurality of vibration modes in which amplitude in at least one of the first direction x and the second direction y of the transmitting sections 24 is different. The control section 9 drives the at least two vibrating bodies 2 in any one vibration mode among the plurality of vibration modes. Note that, as explained above, the at least two vibrating bodies 2 among the plurality of vibrating bodies 2 only have to have the plurality of vibration modes in which vibration tracks of the transmitting sections 24 are different. In this embodiment, all the vibrating bodies 2 have the plurality of vibration modes in which the vibration tracks of the transmitting sections 24 are different. Consequently, it is possible to more highly accurately control the rotation (speed, a braking force, torque, etc.) of the rotor 110. The driving device 1 has a more excellent driving characteristic.

The plurality of vibration modes of the vibrating bodies 2 are explained. The plurality of vibration modes are not particularly limited as long as the vibration tracks of the transmitting sections 24 are different. In this embodiment, the plurality of vibration modes include a first vibration mode in which the transmission sections 24 are vibrated in the second direction y while being vibrated in the first direction x, a second vibration mode in which the transmitting sections 24 are vibrated such that the amplitude in the second direction y is smaller than the amplitude in the first vibration mode, and a third vibration mode in which the transmitting section 24 is vibrated such that the amplitude in the first direction x is smaller than the amplitude in the first vibration mode. Explanation of the first, second, and third vibration modes is omitted because the first, second, and third vibration modes are the same as the first, second, and third vibration modes explained in the first and second embodiments.

The control section 9 is explained. The control section 9 can independently control driving of at least two vibrating bodies 2. Note that, in this embodiment, the control section 9 can independently control driving of all the vibrating bodies 2. That is, the control section 9 can select whether all the vibrating bodies 2 are driven in the first vibration mode, driven in the second vibration mode, or driven in the third vibration mode. Consequently, it is possible to more highly accurately control the rotation (speed, a braking force, torque, etc.) of the rotor 110. The driving device 1 has a more excellent driving characteristic.

The control section 9 changes, according to driving speed (rotating speed) of the rotor 110, the number of the vibrating bodies 2 in which the transmitting sections 24 vibrate in the first vibration mode. Consequently, it is possible to more highly accurately control the rotation (speed, a braking force, torque, etc.) of the rotor 110. The driving device 1 has a more excellent driving characteristic. Specifically, as the driving speed (the rotating speed) of the rotor 110 increases, the control section 9 increases the number of the vibrating bodies 2 in which the transmitting sections 24 vibrate in the first vibration mode. That is, the control section 9 generates a larger driving force as the driving speed (the rotating speed) of the rotor 110 increases. For example, as shown in FIG. 12, when the rotor 110 is driven at low speed, the control section 9 vibrates one vibrating body 2 in the first vibration mode and drives the other vibrating bodies 2 in the second vibration mode or the third vibration mode. When the rotor 110 is driven at intermediate speed (speed higher than the low speed), the control section 9 vibrates two vibrating bodies 2 in the first vibration mode and vibrates the other vibrating bodies 2 in the second vibration mode or the third vibration mode. When the rotor 110 is driven at high speed (speed higher than the intermediate speed), the control section 9 vibrates the three vibrating bodies 2 in the first vibration mode and vibrates the other vibrating bodies 2 in the second vibration mode or the third vibration mode. When the rotor 110 is driven at ultrahigh speed (speed higher than the high speed), the control section 9 vibrates all the vibrating bodies 2 in the first vibration mode. Consequently, it is possible to more highly accurately control the rotation (speed, a braking force, torque, etc.) of the rotor 110. The driving device 1 has a more excellent driving characteristic.

An example is explained in which the rotor 110 is driven at low speed. By changing the number of the vibrating bodies 2 vibrated in the second vibration mode among the three vibrating bodies 2 not driven in the first vibration mode, it is possible to more highly accurately control the rotation (speed, a braking force, torque, etc.) of the rotor 110. More specifically, for example, if it is assumed that an average frictional force F2 between the transmitting sections 24 vibrating in the second vibration mode and the rotor 110 is smaller than an average frictional force F3 between the transmitting sections 24 vibrating in the third vibration mode and the rotor 110, by increasing the number of the vibrating bodies 2 vibrating in the second vibration mode, it is possible to reduce a frictional force of the entire three vibrating bodies 2. The rotating speed of the rotor 110 slightly increases. That is, as shown in FIG. 12, in the low speed, it is possible to select speed in four stages (low speed 1, low speed 2, low speed 3, and low speed 4 in ascending order). The same applies to the intermediate speed and the high speed.

According to the third embodiment explained above, it is possible to exhibit the same effects as the effects in the first embodiment. Note that, in the above explanting in this embodiment, the frictional force F2 is smaller than the frictional force F3. However, not only this, but the frictional force F2 may be larger than the frictional force F3. In this case, the control same as the control in this embodiment is possible. The frictional force F2 and the frictional force F3 may be equal.

Fourth Embodiment

A piezoelectric motor according to a fourth embodiment of the invention is explained.

Figure 13:
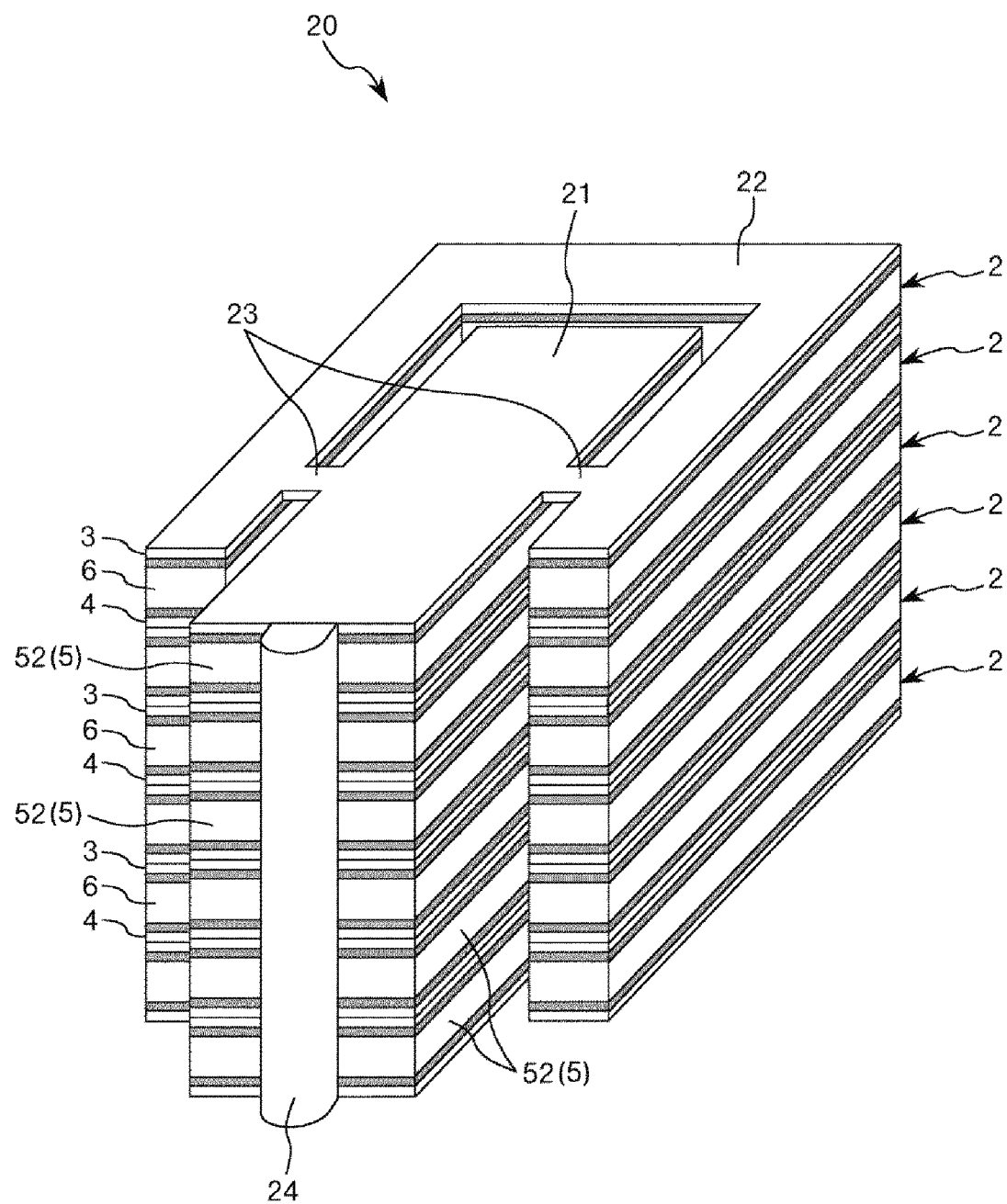
FIG. 13 is a perspective view of a vibrating body included in a piezoelectric motor according to a fourth embodiment of the invention.

FIG. 13 is a perspective view of a vibrating body included in the piezoelectric motor according to the fourth embodiment.

In the following explanation, concerning the piezoelectric motor according to the fourth embodiment, differences from the embodiments explained above are mainly explained. Explanation of similarities is omitted.

The piezoelectric motor according to the fourth embodiment is substantially the same as the piezoelectric motor according to the first embodiment except that the configuration of a vibrating body is different. Note that the same components as the components in the embodiments explained above are denoted by the same reference numerals and signs.

As shown in FIG. 13, a vibrating body 20 in this embodiment includes a stacked plurality of piezoelectric bodies 52. Specifically, in the vibrating body 20, a plurality of the vibrating bodies 2 in the first embodiment are stacked. Consequently, a driving force of the vibrating bodies 20 increases. Note that the control section 9 performs control to apply the same driving voltage to the plurality of vibrating bodies 2 belonging to one vibrating body 20.

According to the fourth embodiment explained above, it is possible to exhibit the same effects as the effects in the first embodiment. Note that, the configuration of the vibrating body is not particularly limited as long as a plurality of piezoelectric bodies are stacked. For example, in the vibrating body 2 explained in the first embodiment, the plurality of piezoelectric bodies 52 (piezoelectric elements 5) may be stacked between the vibrating plate 31 and the vibrating plate 41.

Fifth Embodiment

A robot according to a fifth embodiment of the invention is explained.

Figure 14:
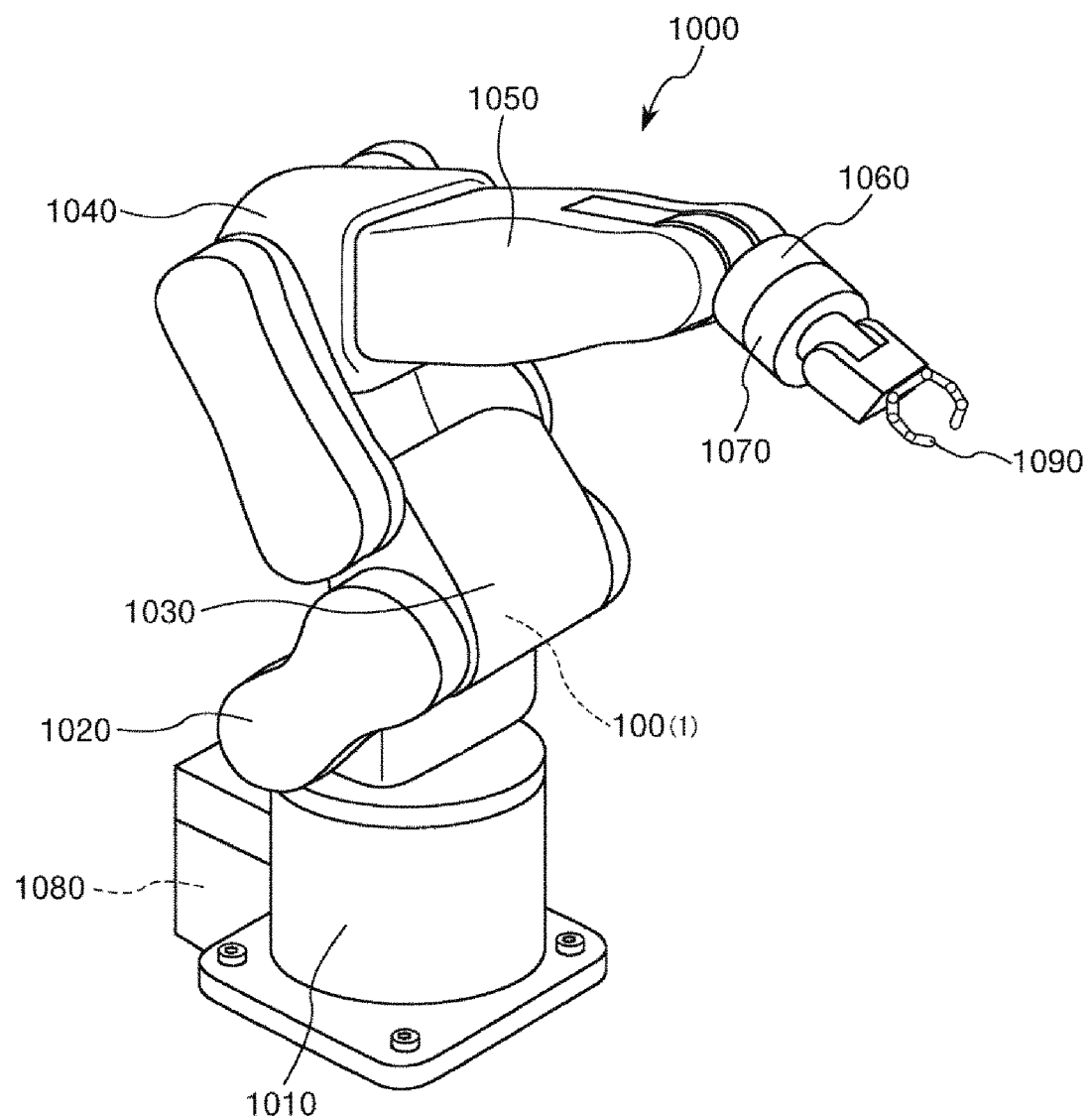
FIG. 14 is a perspective view showing a robot according to a fifth embodiment of the invention.

FIG. 14 is a perspective view showing the robot according to a fifth embodiment of the invention.

A robot 1000 shown in FIG. 14 can perform work such as supply, removal, conveyance, and assembly of a precision instrument and components configuring the precision instrument (target objects). The robot 1000 is a six-axis robot and includes a base 1010 fixed to a floor or a ceiling, an arm 1020 turnably coupled to the base 1010, an arm 1030 turnably coupled to the arm 1020, an arm 1040 turnably coupled to the arm 1030, an arm 1050 turnably coupled to the arm 1040, an arm 1060 turnably coupled to the arm 1050, an arm 1070 turnably coupled to the arm 1060, and a robot control section 1080 that controls driving of the arms 1020, 1030, 1040, 1050, 1060, and 1070. A hand connecting section is provided in the arm 1070. An end effector 1090 corresponding to work executed by the robot 1000 is attached to the hand connecting section. One or a plurality of the piezoelectric motors 100 (the driving devices 1) are mounted on a part or all of joint sections. The arms 1020, 1030, 1040, 1050, 1060, and 1070 turn according to driving of the piezoelectric motors 100. Note that the driving of the piezoelectric motors 100 is controlled by the robot control section 1080.

The robot 1000 includes the piezoelectric motor 100 (the driving device 1). Therefore, the robot 1000 can enjoy the effects of the driving device 1 explained above and can exhibit excellent reliability.

Sixth Embodiment

An electronic-component conveying device according to a sixth embodiment of the invention is explained.

Figure 15:
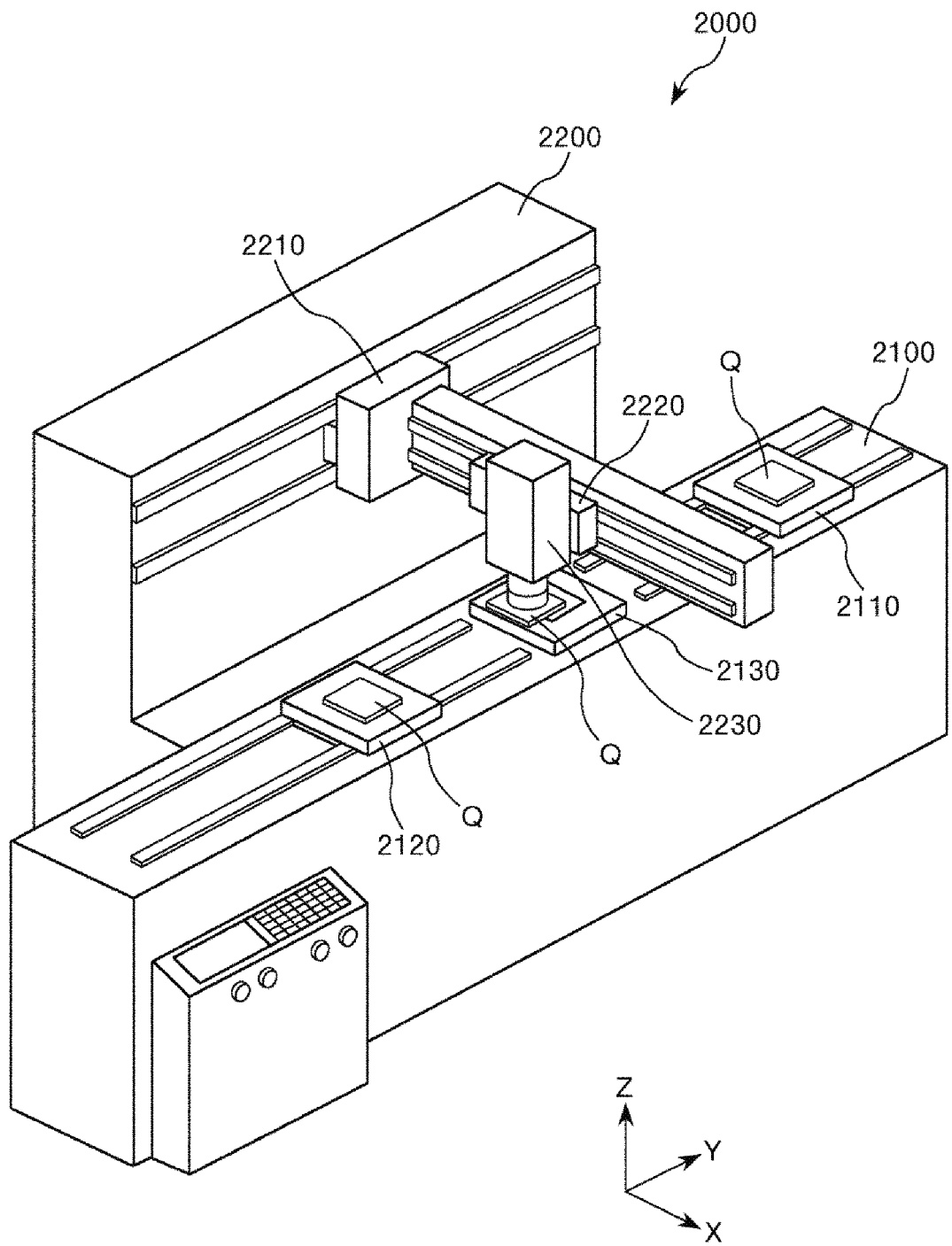
FIG. 15 is a perspective view showing an electronic-component conveying device according to a sixth embodiment of the invention.
Figure 16:
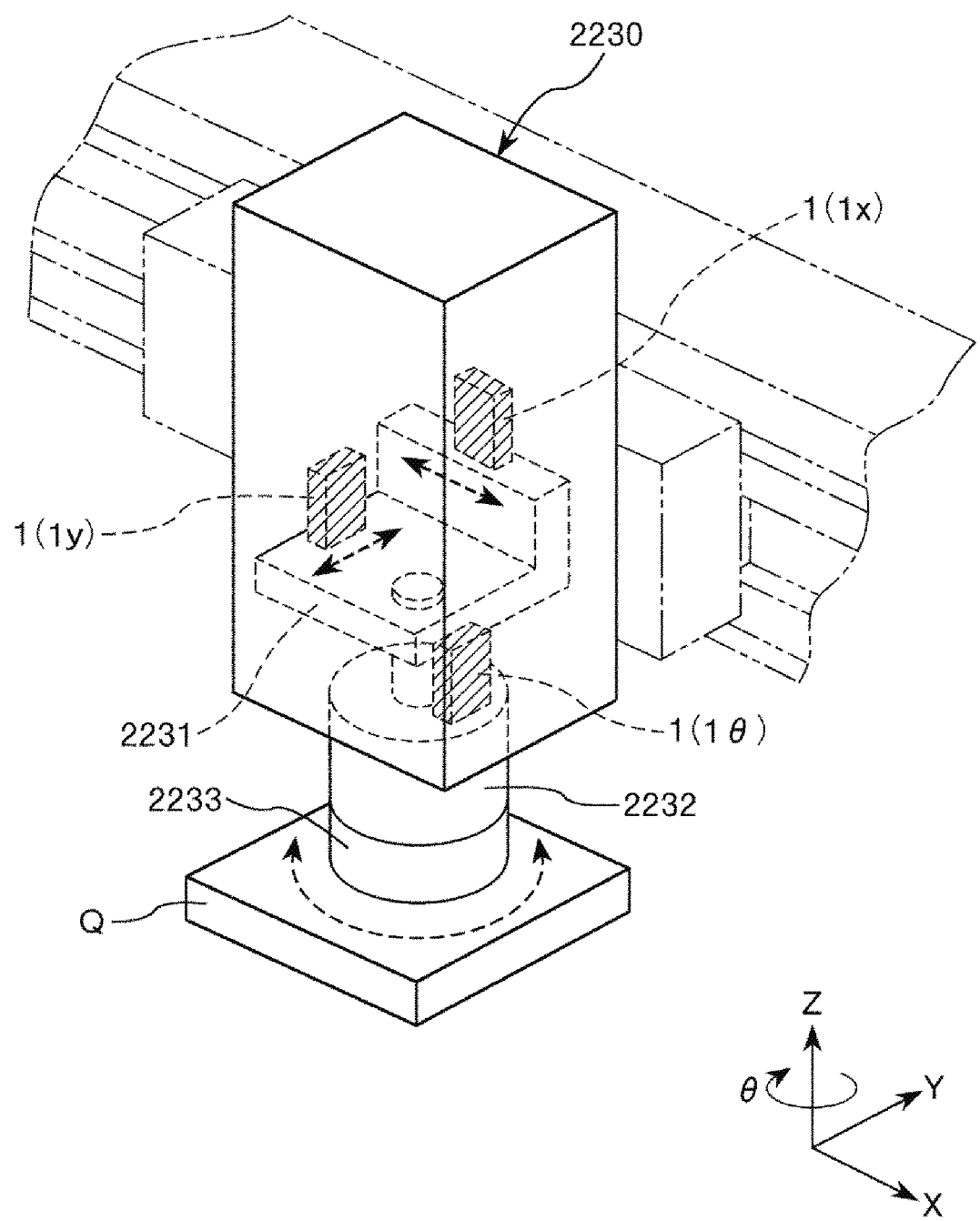
FIG. 16 is a perspective view showing an electronic-component holding section included in the electronic-component conveying device shown in FIG. 15.

FIG. 15 is a perspective view showing the electronic-component conveying device according to the sixth embodiment of the invention. FIG. 16 is a perspective view showing an electronic-component holding section included in the electronic-component conveying device shown in FIG. 15. Note that, in the following explanation, for convenience of explanation, three axes orthogonal to one another are represented as an X axis, a Y axis, and a Z axis.

An electronic-component conveying device 2000 shown in FIG. 15 is applied to an electronic-component inspection apparatus and includes a base 2100 and a supporting table 2200 disposed on a side of the base 2100. On the base 2100, an upstream side stage 2110 on which an inspection target electronic component Q is placed and conveyed in the Y-axis direction, a downstream side stage 2120 on which an inspected electronic component Q is placed and conveyed in the Y-axis direction, and an inspection table 2130 located between the upstream side stage 2110 and the downstream side stage 2120 and used for inspecting an electric characteristic of the electronic component Q are provided. Note that examples of the electronic component Q include a semiconductor, a semiconductor wafer, display devices such as a CLD and an OLED, a quartz device, various sensors, an inkjet head, and various MEMS devices.

On the supporting table 2200, a Y stage 2210 movable in a Y-axis direction with respect to the supporting stage 2200 is provided. On the Y stage 2210, an X stage 2220 movable in an X-axis direction with respect to the Y stage 2210 is provided. On the X stage 2220, an electronic-component holding section 2230 movable in a Z-axis direction with respect to the X stage 2220 is provided. As shown in FIG. 16, the electronic-component holding section 2230 includes a fine adjustment plate 2231 movable in the X-axis direction and the Y-axis direction, a turning section 2232 turnable around the Z axis with respect to the fine adjustment plate 2231, and a holding section 2233 provided in the turning section 2232 to hold the electronic component Q. In the electronic-component holding section 2230, a driving device 1 (1x) for moving the fine adjustment plate 2231 in the X-axis direction, a driving device 1 (1y) for moving the fine adjustment plate 2231 in the Y-axis direction, and a driving device 1 (1θ) for turning the turning section 2232 around the Z axis are incorporated.

The electronic-component conveying device 2000 includes the driving device 1. Therefore, the electronic-component conveying device 2000 can enjoy the effects of the driving device 1 and can exhibit excellent reliability.

Seventh Embodiment

A printer according to a seventh embodiment of the invention is explained.

Figure 17:
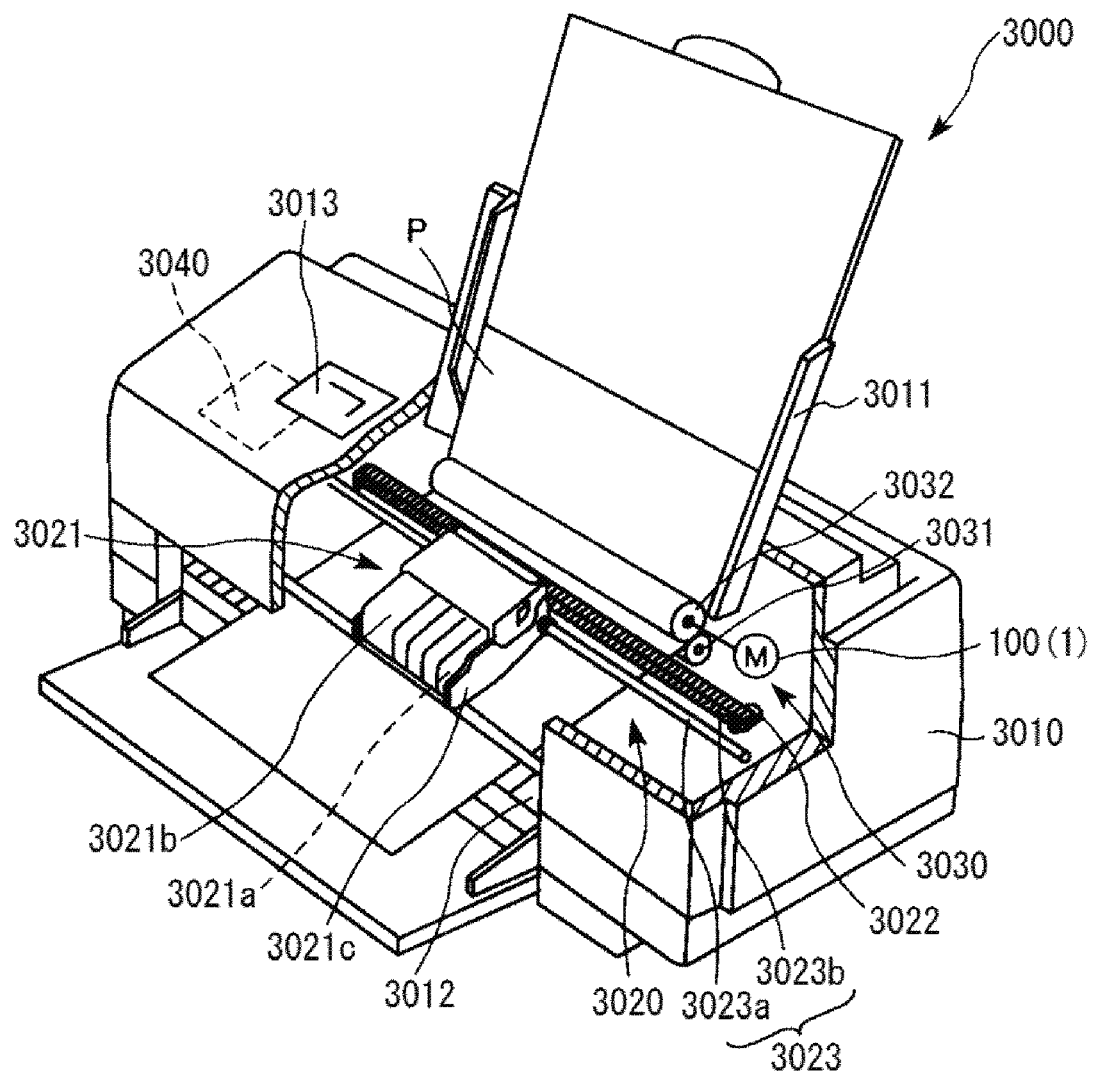
FIG. 17 is a schematic view showing an overall configuration of a printer according to a seventh embodiment of the invention.

FIG. 17 is a schematic diagram showing an overall configuration of the printer according to the seventh embodiment of the invention.

A printer 3000 shown in FIG. 17 includes an apparatus main body 3010 and a printing mechanism 3020, a paper feeding mechanism 3030, and a control section 3040 provided in the inside of the apparatus main body 3010.

In the apparatus main body 3010, a tray 3011 on which recording sheets P are set, a paper discharge port 3012 for discharging the recording sheets P, and an operation panel 3013 such as a liquid crystal display are provided.

The printing mechanism 3020 includes a head unit 3021, a carriage motor 3022, and a reciprocating mechanism 3023 for causing the head unit 3021 to reciprocate with a driving force of the carriage motor 3022.

The head unit 3021 includes a head 3021a, which is an inkjet recording head, an ink cartridge 3021b that supplies ink to the head 3021a, and a carriage 3021c mounted with the head 3021a and the ink cartridge 3021b.

The reciprocating mechanism 3023 includes a carriage guide shaft 3023a that supports the carriage 3021c to be capable of reciprocating and a timing belt 3023b that moves the carriage 3021c on the carriage guide shaft 3023a with the driving force of the carriage motor 3022.

The paper feeding mechanism 3030 includes a driven roller 3031 and a driving roller 3032 in press-contact with each other and the piezoelectric motor 100 (the driving device 1), which is a paper feeding motor that drives the driving roller 3032.

The control section 3040 controls the printing mechanism 3020, the paper feeding mechanism 3030, and the like on the basis of printing data input from a host computer such as a personal computer.

In the printer 3000, the paper feeding mechanism 3030 intermittently feeds the recording sheets P one by one to near a lower part of the head unit 3021. At this point, the head unit 3021 reciprocates in a direction substantially orthogonal to a feeding direction of the recording sheets P. Printing on the recording sheets P is performed.

The printer 3000 includes the piezoelectric motor 100 (the driving device 1). Therefore, the printer 3000 can enjoy the effects of the driving device 1 and can exhibit excellent reliability. Note that, in this embodiment, the piezoelectric motor 100 drives the driving roller 3032 for paper feeding. Besides, for example, the piezoelectric motor 100 may drive the carriage 3021c.

The embodiments of the invention are explained above. However, the invention is not limited to the embodiments. The components of the sections can be replaced with any components having the same functions. Any other components may be added to the invention. The embodiments may be combined as appropriate.

In the embodiments, the driving device is applied to the piezoelectric motor, the robot, the electronic-component conveying device, and the printer. However, the driving device can be applied to various electronic devices other than the piezoelectric motor, the robot, the electronic-component conveying device, and the printer.

The entire disclosure of Japanese Patent Application No. 2016-211052, filed Oct. 27, 2016 is expressly incorporated by reference herein.

What is claimed is:

1. A driving device comprising:
   a plurality of vibrating bodies including transmitting sections configured to transmit vibration to a driven section; and
   a control section configured to change vibration tracks of the transmitting sections of the plurality of vibrating bodies independently from one another,
   wherein the vibration tracks of the transmitting sections of the plurality of vibrating bodies are different from one another, and
   the plurality of vibrating bodies are disposed side by side and spaced apart from one another via an air gap in a driving direction of the driven section.

2. The device according to claim 1, wherein
   when a direction in which the driven section and the vibrating bodies are arranged is represented as a first direction and a direction orthogonal to the first direction is represented as a second direction,
   the plurality of vibrating bodies have a plurality of vibration modes in which amplitudes in at least one of the first direction and the second direction are different, and
   the control section drives the plurality of vibrating bodies in any one vibration mode among the plurality of vibration modes.

3. The device according to claim 2, wherein the plurality of vibration modes include a first vibration mode in which the transmitting sections have amplitudes in the first direction and the second direction and a second vibration mode in which the amplitude in the second direction is smaller than the amplitude in the first vibration mode in the transmitting sections.

4. The device according to claim 2, wherein the plurality of vibration modes include a first vibration mode in which the transmitting sections have amplitudes in the first direction and the second direction and a third vibration mode in which the amplitude in the first direction is smaller than the amplitude in the first vibration mode in the transmitting sections.

5. The device according to claim 3, wherein the control section changes, according to driving speed of the driven section, a number of the vibrating bodies in which the transmitting sections vibrate in the first vibration mode.

6. The device according to claim 5, wherein, when the driving speed of the driven section increases, the control section increases the number of vibrating bodies in which the transmitting sections vibrate in the first vibration mode.

7. The device according to claim 1, wherein the vibrating body includes a piezoelectric body.

8. The driving device according to claim 7, wherein the vibrating body includes a stacked plurality of the piezoelectric bodies.

9. A piezoelectric motor comprising the driving device according to claim 1.

10. A robot comprising the driving device according to claim 1.

11. An electronic-component conveying device comprising the driving device according to claim 1.

12. A printer comprising the driving device according to claim 1.

* * * * *